United States Patent

[11] 3,534,650

| [72] | Inventor | Charles C. Kubokawa |
| | | Palo Alto, California |
| [21] | Appl. No. | 783,379 |
| [22] | Filed | Dec. 12, 1968 |
| [45] | Patented | Oct. 20, 1970 |
| [73] | Assignee | The United States of America as represented by the Administrator of the National Aeronautics and Space Administration |

[54] FASTENER APPARATUS
5 Claims, 4 Drawing Figs.

[52] U.S. Cl. .................................................. 85/3
 24/211
[51] Int. Cl. ...................................... F16b 21/00,
 F16b 35/04
[50] Field of Search ......................................... 85/3(S),
 3, 3(K), 5(M), 5(E), 5(B), 5, 81; 24/211, 211(N)

[56] References Cited
UNITED STATES PATENTS

| 2,132,284 | 10/1938 | Bonham | 85/3(S) |
| 2,408,560 | 10/1946 | Keehn | 85/3(S) |
| 2,494,159 | 1/1950 | Bernstein | 85/3 |

FOREIGN PATENTS

| 12,612 | 5/1906 | Great Britain | 85/3 |
| 500,632 | 2/1939 | Great Britain | 85/3 |
| 553,142 | 5/1943 | Great Britain | 85/3 |

Primary Examiner — Ramon S. Britts
Attorneys — Darrell G. Brekke and G.T. McCoy

ABSTRACT: A releasable pin-type fastening means having an adjustable length and including toggle-type bulkhead engaging means for enabling quick engagement, release and fastening operation. The fastening means can be inserted through an aperture in a bulkhead, or the like, far enough to allow the toggle means to clear the aperture on the far side of the bulkhead and threaded means are provided for drawing the toggle means into engagement with the bulkhead for secure attachment thereto. A fastening means having both high tensile strength and high shear strength is thus provided.

Patented Oct. 20, 1970
3,534,650
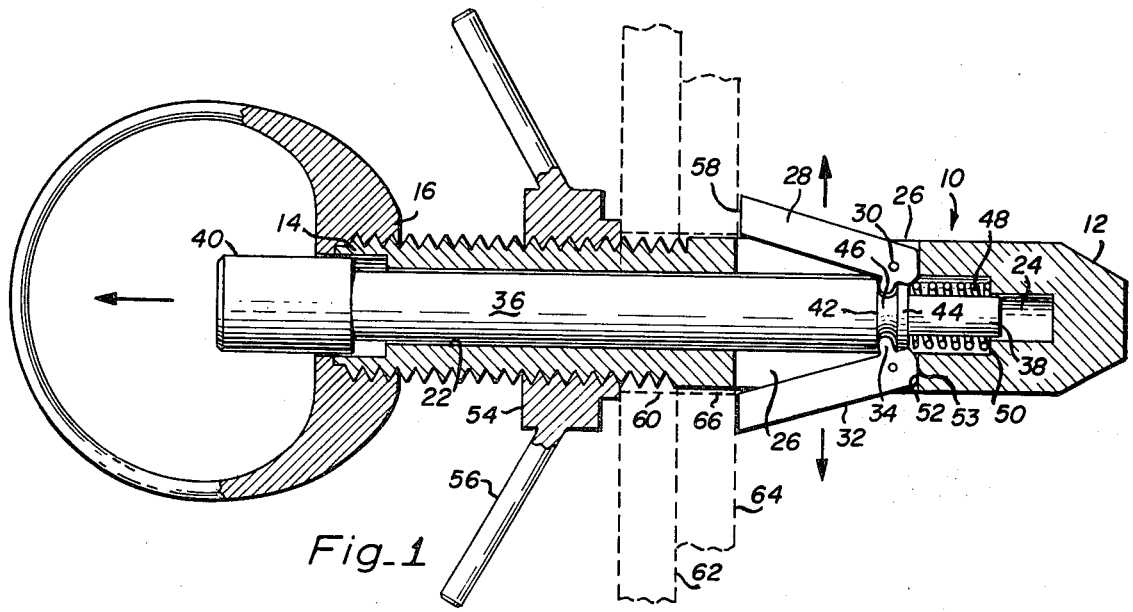
Fig_1
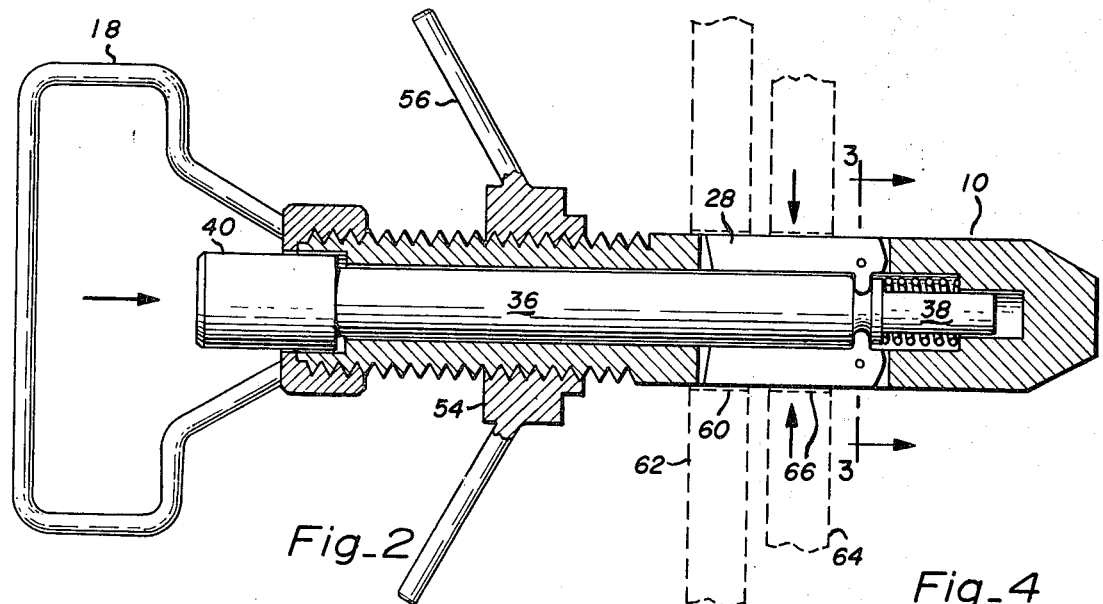
Fig_2
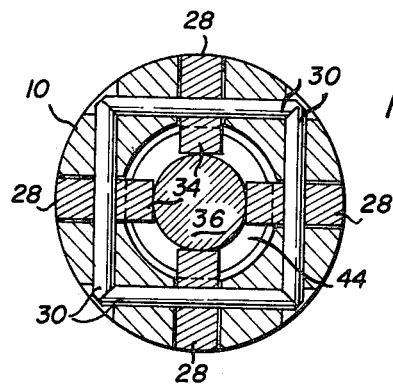
Fig_3
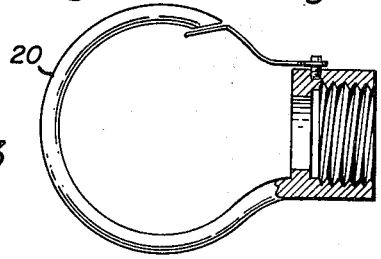
Fig_4
INVENTOR.
CHARLES C. KUBOKAWA
BY
ATTORNEYS

FASTENER APPARATUS

The invention described herein was made by an employee of the United States Government and may be manufactured and used by or for the Government for governmental purposes without the payment of any royalties thereon or therefor.

BACKGROUND OF THE INVENTION

In many applications it is desirable that one be able to attach a fastening means to an object utilizing a minimum number of parts and a minimum number of operative steps to complete the fastening operation. In certain instances, it is also desirable that one be able to securely fasten together two or more plates or other objects with holes predrilled through each without the need of assistance and without requiring access to the far side of the objects to be fastened together.

One particular area in which it is necessary that such means be provided is that relating to assembly of components in outer space. The astronaut, for example, may require that such a means be at his disposal during the assembly in space of several components or for providing a connecting means to a spacecraft or docking stations, or for simply retrieving an apparatus floating in space. In space assembly and tie-down operations, there will be many instances when only one man will be available to complete an assembly or tie-down operation. Therefore it is necessary that he have means which will not require that he carry special hand tools or need the assistance of another person in completing an assembly or tie-down. In other words, he must be able without assistance to fasten objects together and create tie-down points to one side of a surface which will typically be too large for him to reach around to the far side. In addition, the fastening apparatus must require a minimum of operative manipulations so that it can be utilized by one wearing bulky gloves.

Furthermore, since there is a well-known weight problem associated with space activities, it is desirable that the fastening apparatus be reusable, and universal in nature so as to minimize the number of required parts carried on a particular mission. Previous operations of this nature have been by nut and bolt methods requiring the use of special tool means, or by latching devices with nonadjustable shank length or tensile strength characteristics.

In many instances, the nut and bolt system requires another person to aid in the assembly or supply the assembler with parts, and once the parts are assembled additional parts cannot be added onto the assembly unless the bolt is completely removed, an operation which usually requires all of the operative steps which were necessary to put the fastening means in place in the first instance. Moreover, the nut and bolt systems require at least two pieces of compatible size which must be mated and tightened.

Whereas, certain fastening devices generally similar to the apparatus of the present invention have been utilized in the past; for example, the spring-loaded, ball-detent, releasable fastening pin device disclosed by Sellers in U.S. Pat. No. 3,183,586; a similar clevis pin-type fastening means disclosed by Chapman in U.S. Pat. No. 3,097,559; and the double acting release pin disclosed by Myers in U.S. Pat. No. 3,085,462; these prior art devices are subject to numerous disadvantages. For example, these devices are designed mainly for shear strength and not for tensile strength. Furthermore, they have no provisions for making shank length adjustment.

Another relevant prior art disclosure is the ship fitting disclosed by Higuchi in U.S. Pat. No. 3,381,925. Although that device does provide some degree of tensile strength it does not allow a simple bayonet type of insertion and the ring cannot be removed for substitution of other fittings. In addition, no positive locking means is provided.

SUMMARY OF THE INVENTION

The present invention relates generally to releasable fasteners and, more particularly, to a releasable pin-type fastening means having an adjustable length for enabling quick engagement, release and fastening operations. The fastening apparatus of the present invention may be used to join two or more members by inserting the fastener through registering holes in the members, or may be used to provide a releasable tie-down facility which can be both engaged and disengaged from a single side of the surface to which it is attached.

In addition to the space applications mentioned above, the present invention will readily find utility in cargo transport handling operations, e.g., commercial airlines, trucking, shipping, etc., where quick tie-down points with high tensile strength are necessary; for quick assembly projects in building structures; temporary assembly operations; underwater assembly operations; as a means for quickly plugging up holes or leaks; and for providing quick attachment points for pulling objects, etc.

One advantage of the present invention is that it provides a single unit attaching means, the operative portion of which is adjustable in length.

Another advantage of the present invention is that it provides an attaching means the components of which are mated together during assembly and requires the application or assembly of no additional components for completing an attaching operation.

Still another advantage of the present invention is that it provides an attaching means which is readily adapted for use by one wearing thick, bulky gloves, and does not require the use of any hand tools.

Still another advantage of the present invention is that is provides fastening means which can be secured by one man using one hand.

It is therefore a principal object of the present invention to provide a reusable single unit fastening means for accommodating tensile forces as well as shear forces and having an adjustable shank length, pin-locking means and releasing mechanism.

Still another object of the present invention is to provide a combination tie-down and fastening means, the fastening operation of which can be completely facilitated from a single side of a bulkhead or the like.

While the novel features and advantages which characterize this invention are pointed out with particularity in the claims annexed to and forming a part of this specification, the invention itself together with further objects and advantages thereof will best be understood upon reference to the following description taken in connection with the accompanying drawings.

IN THE DRAWINGS

FIG. 1 is an axial cross section of the fastening apparatus of the present invention showing the toggle wings fully extended.

FIG. 2 is an axial cross section of the fastening apparatus of the present invention showing the toggle wings retracted.

FIG. 3 is a cross section taken along the lines of 3-3 of FIG. 2 and further illustrating the toggle mechanism in accordance with the present invention.

FIG. 4 illustrates a snap-hook nut for use in accordance with the present invention.

DETAILED DESCRIPTION OF THE PREFERRED EMBODIMENTS

Referring now to the drawings, there is shown a preferred embodiment of the fastening apparatus in accordance with the present invention. The fastener is essentially comprised of an elongated generally cylindrical fastener body 10. The head end 12 of which is tapered and the butt end 14 of which is threaded to receive a ring-head nut 16, handgrip nut 18 (FIG. 2), or snap-hook nut 20 (FIG. 4). The body 10 has a cylindrical bore 22 which extends along the axis of the body 10 for substantially the entire length thereof. The distal end 24 of the bore 22, which extends into the head 12, is of reduced diameter for reasons to be explained below.

Four rectangularly shaped apertures 26 are provided in the body 10 at a predetermined distance from the head end 12 thereof. The apertures 26 extend completely through the wall of the body 10 and into the cylindrical bore 22 and provide a receptacle for receiving four toggle wing members (detents) 28, which are pivotably secured within the apertures 26 by lock pins 30. (See FIG. 3) The toggle wings 28 are generally rectangular in cross section, although the outer edges 32 thereof may be shaped to conform to the outer surface of the body 10 when in the closed position. The toggle wings 28 also include tab means 34, which are located opposite the holes for receiving the pins 30. As illustrated in the drawing, the tabs 34 extend into the cylindrical bore of the body 10 and serve as lever arms for facilitating the rotatable positioning of the wings 28 about the pins 30.

An actuator pin 36 is received within the bore 22 and the distal end 38 thereof is received within the end portion 24 which serves to align the end 38 within the center of the bore 22. The other end 40 of the shaft 36 is of larger diameter and protrudes out of the bore 22 when located in its operative position. The end 40 serves to provide a "thumb" means by which the shaft 36 may be depressed and caused to move into the body 10. In this embodiment, the diameter of the bore 22 at the open end of the body 10 is increased slightly so as to receive the shaft end 40 which also serves to align the shaft 36 within the bore 22.

Spaced a short distance from the end 38 of the shaft 36 are a pair of shoulders 42 and 44 which form an annular recess 46 into which the tabs 34 are received. A spring means 48 is positioned between the bore shoulder 50 and the shaft shoulder 44 for biasing the actuator shaft 36 away from end 12 and causing the toggle wings 28 to be flared outwardly, as shown in FIG. 1. The edges 52 of the toggle wings 28 serve as stop means which abut the wall 53 of opening 26 to limit the outward flare of the toggle wings 28 and transmit the forces applied to the ends 58 directly to the wall 53 and thus reduce the shear on pins 30. The interaction between the tabs 34 and the shoulder 44 provide a keeper means for limiting the travel of the actuator shaft 36 in the leftward direction. In this preferred embodiment the outer surface of the body 10 is threaded from the end 14 to a position substantially adjacent the rearward extension of the apertures 26 and a lock nut means 54 having a pair of inclined tightening arms 56 is threadably received thereon. Arms 56 are inclined to prevent finger chaffing when drawing nut 54 against an apertured member.

When not in use, the actuator pin 36 is normally biased toward end 14 by spring 48 so that the toggle wings 28 are flared outwardly as illustrated in FIG. 1, whereby an axial force applied to the end of the actuator pin causes the toggle wings to be cammed completely into the apertures and assume a position substantially parallel to the axis of the body member. In operation, a force is applied to actuator pin end 40 causing shoulder 42 to press against tabs 34 and pivot the toggle wings 28 into a retracted position as illustrated in FIG. 2. Body 10 can then be inserted into an aperture 60 in member 62 and/or aperture 66 in member 64. The force is then removed from pin end 40 allowing spring 48 to push pin 36 outwardly from body 10. As pin 36 moves, shoulder 44 presses on tabs 34 and causes the toggle wings 28 to protrude from body 10. It should, of course, be apparent that the body 10 can likewise be forced through an aperture without applying pressure to the shaft end 40 since the engagement of the aperture edges will cause the wings to collapse sufficiently to permit passage therethrough.

With the wings 28 pivoted outwardly as shown in FIG. 1, the body 10 is now prevented from being retracted through the aperture 60 and can be firmly fixed to one or more members (62, 64, etc.) by tightening the lock nut 54 thereagainst.

Nuts 16, 18 and 20 serve many purposes. They serve as handles to facilitate the insertion or extraction of body 10 from one or more apertures. They act as mechanical guards to prevent pin end 40 from accidentally being depressed. While nut 18 is especially suited for use as a handhold, all of the nuts are useful as tie-downs for ropes, cables, etc. Once lock nut 54 is secured against an apertured member, ring-head nut 16 (or nuts 18 and 20) may be removed and the exposed threads may be used as a stud member to which any suitable apparatus may be secured.

A further use of the device is to fasten one or more apertured members to an apertured wall and especially a wall wherein simultaneous access to both sides by one operator is impossible. This can be accomplished by aligning the aperture in the wall with the aperture in the attachment(s), passing the body 10 through the apertures until wings 28 are free to protrude from body 10, and then tightening the lock nut 54 for drawing the wall and the attachments securely together. (Referring to FIGS. 1 and 2, member 64 would be the wall and member 62 would be the attachment. Obviously, if desired, other attachments could be inserted between lock nut 54 and member 62. Neither the wall nor the attachments would have to planar as depicted. For example, the wall could be convex and the attachment could be concave.)

With the nut 54 tightened against the wall 62 the frictional engagement of the wall 64 with the ends 58 is usually sufficient to prevent accidental release of the fastening means due to an unintentional bumping of end 40 of the actuator pin 36. In order to permit the release of the fastener, the nut means 54 must be slightly loosened so as to free the wing ends 58 from the wall 64. The release button 40 can then be depressed and the fastener can be easily withdrawn.

When the device is used solely as a tie-down, handhold, toehold, etc., it is apparent that body 10 need only be inserted through a single apertured member.

After having read the above disclosure it will, of course, be apparent that many modifications of the present invention may be made without departing from the merits thereof. For example, either more or less than four of the wing members 28 may be utilized for a given application. Furthermore, the general design thereof may be varied for a particular use and it is contemplated that many types of alternate tie-down modifications replacing the ring-head nut 16 will become apparent to those skilled in the art.

I claim:

1. A fastening apparatus of the type described comprising:
   an elongated body member having a bored out portion which extends from one end thereof along substantially the entire length of said body member, said body member also including a plurality of apertures which extend through the sides of said body member and into said bored out portion proximate the other end of said body member;
   toggle means pivotably secured in said elongated apertures at the end thereof remote from said one end of said body member for pivoting about said remote end, said toggle means including tab means adjacent said remote end which extend into said bored out portion;
   an elongated plunger means disposed in said bored out portion with one end thereof projecting beyond said one end of said body member and including an annular recessed portion operatively engaging said tab members, biasing means urging said plunger means in the direction of said one end of said body member so as to cause said toggle means to be normally pivoted into a flared out position, whereby an axial force applied to the projecting end of said plunger causes said toggle means to be cammed completely into said apertures to assume a position substantially parallel to the axis of said body member; and
   lock means operatively engaging a portion of the exterior surface of said body member for providing a clamping action between said lock means and the flared ends of said toggle means.

2. A fastening apparatus as recited in claim 1 wherein the external surface of said body member is threaded from said one end thereof substantially to said elongated apertures.

3. A fastening apparatus as recited in claim 2 wherein said body member is generally circular in cross section and has the other end thereof tapered to facilitate entry thereof into a circular aperture.

4. A fastening apparatus as recited in claim 3 and further including a ring-type tie-down means which is threadably received by said one end of said body member and includes an aperture therein through which said plunger means extends.

5. A fastening apparatus as recited in claim 4 wherein said toggle means includes a shoulder portion adjacent said tab means for engaging a portion of said plunger means adjacent said annular recess means for limiting the outward pivoting of said toggle members while at the same time combining with said tab means to provide a retainer means for said plunger means.